US011935254B2

(12) United States Patent
Guo et al.

(10) Patent No.: US 11,935,254 B2
(45) Date of Patent: Mar. 19, 2024

(54) SYSTEMS AND METHODS FOR PREDICTING DEPTH USING STYLE TRANSFER

(71) Applicant: Toyota Motor Engineering & Manufacturing North America, Inc., Plano, TX (US)

(72) Inventors: Rui Guo, San Jose, CA (US); Xuewei Qi, Dublin, CA (US); Kentaro Oguchi, Mountain View, CA (US); Kareem Metwaly, State College, PA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 285 days.

(21) Appl. No.: 17/342,853

(22) Filed: Jun. 9, 2021

(65) Prior Publication Data

US 2022/0398757 A1   Dec. 15, 2022

(51) Int. Cl.
*G06T 7/50* (2017.01)
*G06N 3/04* (2023.01)
(Continued)

(52) U.S. Cl.
CPC ............ *G06T 7/50* (2017.01); *G06N 3/045* (2023.01); *G06T 7/70* (2017.01);
(Continued)

(58) Field of Classification Search
CPC ... G06T 7/50; G06T 7/70; G06T 2207/10028; G06T 2207/20081; G06T 2207/20084; G06N 3/045
See application file for complete search history.

(56) References Cited

U.S. PATENT DOCUMENTS

| 7,113,867 B1 | 9/2006 | Stein |
| 10,762,650 B1 | 9/2020 | Guo et al. |

(Continued)

FOREIGN PATENT DOCUMENTS

| CN | 107578436 A | 1/2018 |
| EP | 3766005 A1 | 1/2021 |
| WO | 2019156877 A1 | 8/2019 |

OTHER PUBLICATIONS

Shi, Jian, et al. "Learning non-lambertian object intrinsics across shapenet categories." Proceedings of the IEEE conference on computer vision and pattern recognition. 2017. (Year: 2017).*

(Continued)

*Primary Examiner* — Edward F Urban
*Assistant Examiner* — Jongbong Nah
(74) *Attorney, Agent, or Firm* — Christopher G. Darrow; Darrow Mustafa PC (57) ABSTRACT

System, methods, and other embodiments described herein relate to improving depth prediction for objects within a low-light image using a style model. In one embodiment, a method includes encoding, by a style model, an input image to identify content information. The method also includes decoding, by the style model, the content information into an albedo component and a shading component. The method also includes generating, by the style model, a synthetic image using the albedo component and the shading component. The method also includes providing the synthetic image to a depth model.

20 Claims, 5 Drawing Sheets

(51) Int. Cl.
G06N 3/045 (2023.01)
G06T 7/70 (2017.01)

(52) U.S. Cl.
CPC .............. G06T 2207/10028 (2013.01); G06T 2207/20081 (2013.01); G06T 2207/20084 (2013.01)

(56) References Cited

U.S. PATENT DOCUMENTS

| | | | |
|---|---|---|---|
| 10,846,887 | B2 | 11/2020 | Dong et al. |
| 10,867,404 | B2 | 12/2020 | Guo et al. |
| 2008/0137989 | A1 | 6/2008 | Ng et al. |
| 2015/0332512 | A1 | 11/2015 | Siddiqui et al. |
| 2018/0293496 | A1 | 10/2018 | Vogels et al. |
| 2019/0286938 | A1 | 9/2019 | Backhus et al. |
| 2020/0286296 | A1 | 9/2020 | Siddiqui et al. |

OTHER PUBLICATIONS

Yin, Zhichao, and Jianping Shi. "Geonet: Unsupervised learning of dense depth, optical flow and camera pose." Proceedings of the IEEE conference on computer vision and pattern recognition. 2018. (Year: 2018).*

Sun, Lei, et al. "See clearer at night: towards robust nighttime semantic segmentation through day-night image conversion." Artificial Intelligence and Machine Learning in Defense Applications. vol. 11169. SPIE, 2019. (Year: 2019).*

Vankadari et al., "Unsupervised Monocular Depth Estimation for Night-time Images using Adversarial Domain Feature Adaptation" Computer Vision—ECCV 2020, Lecture Notes in Computer Science, vol. 12373, pp. 443-459.

Zha et al., "Unsupervised Image Transformation Learning via Generative Adversarial Networks," arXiv:2103.07751v1, pp. 1-14, Mar. 13, 2021.

Lin et al., "GAN-Based Day-to-Night Image Style Transfer for Nighttime Vehicle Detection," IEEE Transactions on Intelligent Transportation Systems, vol. 22, No. 2, pp. 951-963, Feb. 2021.

Anoosheh et al., "Night-to-Day Image Translation for Retrieval-based Localization," 2019 International Conference on Robotics and Automation, 2019, pp. 5958-5964.

Karlsson et al., "Generative Adversarial Networks for Image-to-Image Translation on Street View and MR Images," Master of Science Thesis in Electrical Engineering & Biomedical Engineering, 2018, 86 pages.

Atapour-Abarghouei et al., "Real-time monocular depth estimation using synthetic data with domain adaptation," Proceedings of the IEEE Conference on Computer Vision and Pattern Recognition, 2018, pp. 2800-2810.

Goodfellow et al., "Generative adversarial nets," In Advances in neural information processing systems, 2014, pp. 2672-2680.

Mirza et al., "Conditional generative adversarial nets," arXiv preprint arXiv:1411.1784, Nov. 6, 2014, pp. 1-7.

Narihiri et al., "Direct Intrinsics: Learning Albedo-Shading Decomposition by Convolutional Regression," Proceedings of the IEEE International Conference on Computer Vision, 2015, pp. 2992-2992.

Huang et al., "Multimodal Unsupervised Image-to-Image Translation," Proceedings of the European Conference on Computer Vision, 2018, pp. 172-189.

Saito et al., "Photorealistic Facial Texture Inference Using Deep Neural Networks," Proceedings of the IEEE Conference on Computer Vision and Pattern Recognition, 2017, pp. 5144-5153.

Chang et al., "PairedCycleGAN: Asymmetric Style Transfer for Applying and Removing Makeup," Proceedings of the EEE Conference on Computer Vision and Pattern Recognition, 2018, pp. 40-48.

Zhu et al., "Unpaired Image-to-Image Translation using Cycle-Consistent Adversarial Networks," Proceedings of the IEEE International Conference on Computer Vision, 2017, pp. 2223-2232.

Bansal et al., "Recycle-GAN: Unsupervised Video Retargeting," Proceedings of the European Conference on Computer Vision, 2018, pp. 119-135.

Liu et al., "Unsupervised Image-to-Image Translation Networks," Proceedings of the 31st International Conference on Neural Information Processing Systems, Dec. 2017, pp. 700-708.

Shi et al. "Learning Non-Lambertian Object Intrinsics across ShapeNet Categories Supplementary Material." Dec. 27, 2016, (19 pages).

* cited by examiner

SYSTEMS AND METHODS FOR PREDICTING DEPTH USING STYLE TRANSFER

TECHNICAL FIELD

The subject matter described herein relates, in general, to predicting depth, and, more particularly, predicting depth using a style transfer to initially process an image.

BACKGROUND

Data from sensors are used by systems to predict the depth of objects within an image. For example, vehicles may be equipped with sensors for acquiring data to facilitate depth estimation of other vehicles, obstacles, pedestrians, and additional aspects of a surrounding environment from images. In various implementations, a light detection and ranging (LIDAR) sensor may handle depth perception directly by using light to scan the surrounding environment, while logic associated with the LIDAR analyzes acquired information to facilitate detecting the presence of objects, thereby avoiding difficulties with estimating depth. Besides LIDAR, cameras may also acquire information about an environment from which a system derives awareness for a vehicle or other device.

In various implementations, a system may use a monocular camera to predict the depth of objects within an image without relying on data from the LIDAR sensor, stereo cameras, or other sensors for reducing complexity. For instance, a depth model can use information from the monocular camera to generate a depth map. Furthermore, a system may optimize an image before depth processing to adjust for poor lighting or weather conditions. However, computations may experience difficulties predicting depth using images from a monocular camera due to low-light environments.

SUMMARY

In one embodiment, example systems and methods relate to a manner of improving the prediction of depth for objects within a low-light image using a style model. In various implementations, a system using monocular camera images to predict depth may experience difficulties generating a depth map in low-light (e.g. nighttime.) Furthermore, complexity may increase when combining information from a monocular camera with other sensor data to increase the clarity of a depth map for low-light conditions. Therefore, in one embodiment, a prediction system may use a machine learning (ML) architecture that converts real images taken in low-light environments into synthetic images using a style model to improve depth maps. Here, the prediction system may use a style model that encodes a low-light image (e.g. a real nighttime image) to separate content and style related to objects within the low-light image and produce a synthetic daytime representation according to the content for improving depth estimates.

Moreover, the style model may use separate decoders to decompose the content into albedo and shading components. Albedo information may identify the intrinsic colors about the image content to improve distinctions between objects within an image. Consequently, the style model may generate the synthetic image for depth estimation by combining the albedo and shading components. As such, the prediction system may estimate depth more effectively by removing style from the low-light image and more efficiently by decoupling albedo and shade decoding to generate the synthetic image.

In one embodiment, a prediction system for improving depth prediction of objects within a low-light image using a style model is disclosed. The prediction system includes a processor and a memory communicably coupled to the processor. The memory stores a prediction module including instructions that when executed by the processor cause the processor to encode, by a style model, an input image to identify content information. The prediction module also includes instructions to decode, by the style model, the content information into an albedo component and a shading component. The prediction module also includes instructions to generate, by the style model, a synthetic image using the albedo component and the shading component. The prediction module also includes instructions to provide the synthetic image to a depth model.

In one embodiment, a non-transitory computer-readable medium for improving depth prediction of objects within a low-light image using a style model and including instructions that when executed by a processor cause the processor to perform one or more functions is disclosed. The instructions include instructions to encode, by a style model, an input image to identify content information. The instructions also include instructions to decode, by the style model, the content information into an albedo component and a shading component. The instructions also include instructions to generate, by the style model, a synthetic image using the albedo component and the shading component. The instructions also include instructions to provide the synthetic image to a depth model.

In one embodiment, a method for improving depth prediction of objects within a low-light image using a style model is disclosed. In one embodiment, the method includes encoding, by a style model, an input image to identify content information. The method also includes decoding, by the style model, the content information into an albedo component and a shading component. The method also includes generating, by the style model, a synthetic image using the albedo component and the shading component. The method also includes providing the synthetic image to a depth model.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with improving depth prediction for objects within a low-light image using a style model are disclosed herein. The style model may decompose the content of low-light images into components optimal for depth prediction. In particular, a prediction system may predict depth using a style model that converts real images taken from low-light environments (e.g. nighttime) by performing albedo and shading decoding using image content with style removed. In this regard, content may identify objects in the real image such as vehicles, pedestrians, buildings, and so on. Whilst, style may identify object features such as colors and lighting conditions. In one approach, the style model may use a generative adversarial network (GAN) with an encoder to remove the style from a sequence of real images to improve identifying object features. As such, the prediction system may generate depth maps with improved clarity from image content by reducing variances between objects within an image caused by style.

Moreover, the prediction system may decode the image content separately by an albedo decoder and a shading decoder to produce a lighter (e.g. daytime) representation. The albedo decoder may identify intrinsic colors of objects without information regarding light projection about the content. Whilst, shading decoding may involve identifying shadows, reflections, and lighting conditions related to the content. In this way, the system may optimize a low-light image for depth processing by distinguishing object features in a radiant (e.g. daytime) representation using an albedo decoder decoupled from shading. Furthermore, the prediction system may use the outputs of the albedo and shading decoders to generate a synthetic image enhanced for depth prediction, particularly in low-light. Thus, by relying on image content and decoupling albedo and shading decoding, the prediction system may predict depth more efficiently and improve object identification using the albedo information and increased radiance.

Figure 1:
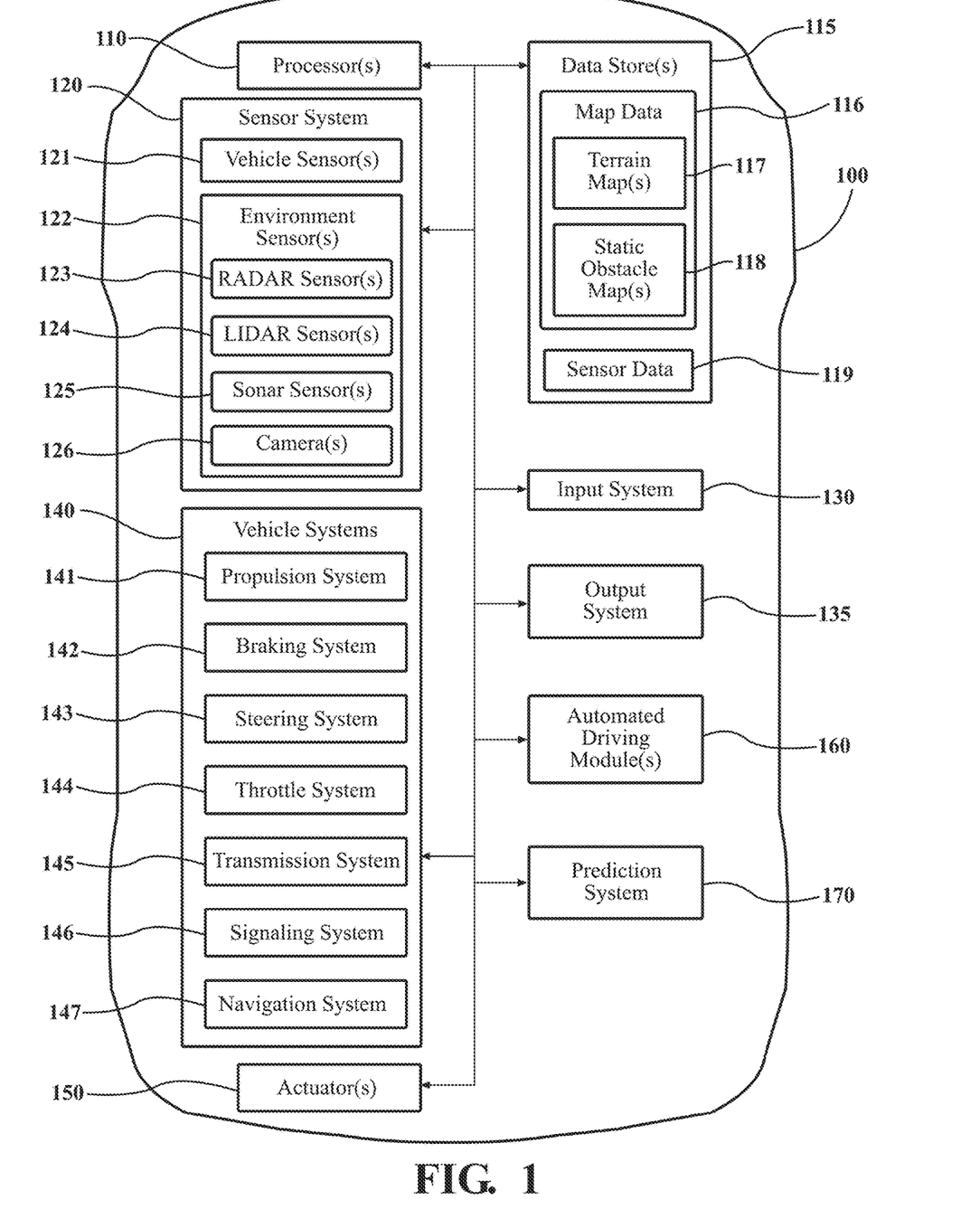
FIG. 1 illustrates one embodiment of a vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the prediction system 170 may be used for consumer electronics (CE), mobile devices, robots, drones, and so on. In some implementations, the vehicle 100 may be any robotic device or form of motorized transport that, for example, includes sensors to perceive aspects of the surrounding environment, and thus benefits from the functionality discussed herein associated with improving depth prediction for objects within a low-light image using a style model.

The vehicle 100 also includes various elements. It will be understood that in various embodiments, the vehicle 100 may have less than the elements shown in FIG. 1. The vehicle 100 can have any combination of the various elements shown in FIG. 1. Furthermore, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Furthermore, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes a prediction system 170 that is implemented to perform methods and other functions as disclosed herein relating to improving depth prediction for objects within a low-light image using a style model.

Figure 2:
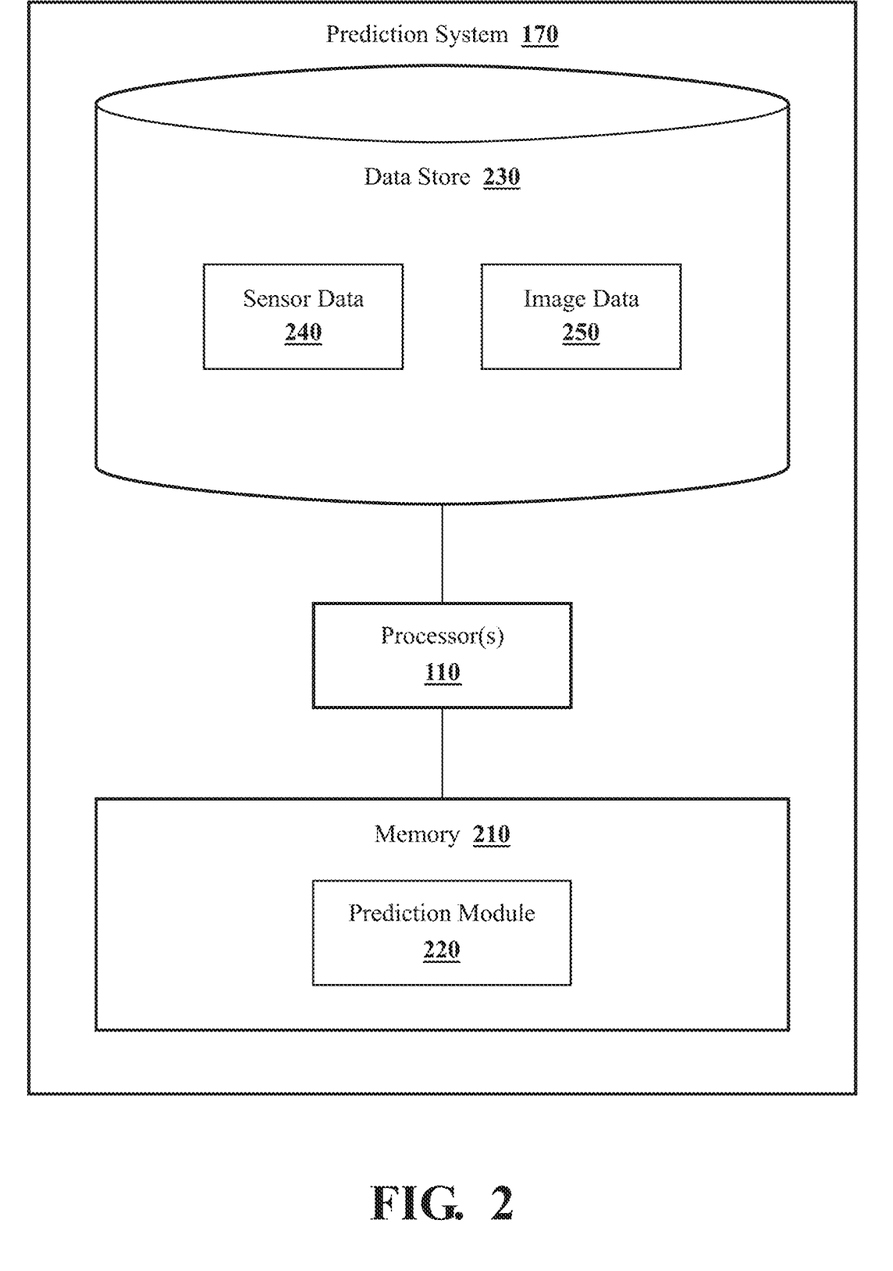
FIG. 2 illustrates one embodiment of a prediction system that is associated with improving depth prediction for objects within a low-light image using a style model.

With reference to FIG. 2, one embodiment of the prediction system 170 of FIG. 1 is further illustrated. The prediction system 170 is shown as including a processor(s) 110 from the vehicle 100 of FIG. 1. Accordingly, the processor(s) 110 may be a part of the prediction system 170, the prediction system 170 may include a separate processor from the processor(s) 110 of the vehicle 100, or the prediction system 170 may access the processor(s) 110 through a data bus or another communication path. In one embodiment, the prediction system 170 includes a memory 210 that stores a prediction module 220. The memory 210 is a random-access memory (RAM), read-only memory (ROM), a hard-disk drive, a flash memory, or other suitable memory for storing the prediction module 220. The prediction module 220 is, for example, computer-readable instructions that when executed by the processor(s) 110 cause the processor(s) 110 to perform the various functions disclosed herein.

The prediction system 170 as illustrated in FIG. 2 is generally an abstracted form of the prediction system 170 where the prediction module 220, in one embodiment, may control the respective sensors to provide the data inputs (e.g. LIDAR data) in the form of the sensor data 240. Additionally, while the prediction module 220 is discussed as controlling the various sensors to provide the sensor data 240, in one or more embodiments, the prediction module 220 can employ other techniques to acquire the sensor data 240 that are either active or passive. Moreover, the prediction module 220 can undertake various approaches to fuse data from multiple sensors when providing the sensor data 240 and/or from sensor data acquired over a wireless communication link.

Moreover, in one embodiment, the prediction system 170 includes a data store 230. In one embodiment, the data store 230 is a database. The database is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 230 stores data used by the prediction module 220 in executing various functions. In one embodiment, the data store 230 includes the sensor data 240 along with, for example, metadata that characterize various aspects of the sensor data 240. In one embodiment, the data store 230 further includes the image data 250. As explained further below, the image data 250 may represent information associated with a real image taken in low-light, nighttime, and so on by a sensor or camera, such as a monocular camera. The image data 250 may also contain content, style, albedo, shading, and so on information. In addition, the image data 250 may include a synthetic image that is a daytime or increased-light representation of the real image.

In various implementations, the prediction module 220 is further configured to perform additional tasks beyond controlling the respective sensors to acquire and provide the sensor data 240. For example, the prediction module 220 includes instructions that cause the processor 110 to convert a sequence of real images of a low-light, nighttime, or inclement weather scene to a synthetic representation with the increased-light or radiance by higher lumens. The prediction module 220 may then generate a depth map from the synthetic image using a depth model.

Regarding lighting levels, low-light may represent lighting environments where a monocular camera, a RGB camera(s), an optical camera(s), human, machine vision, and so on may have difficulties identifying object features due to reduced color intensities. For instance, driving the vehicle 100 during nighttime or using the prediction system 170 in the dark, indoors, at twilight, and so on represent environments having low-light. Increased-light may represent brighter lighting conditions where a monocular camera, a RGB camera(s), an optical camera(s), human, machine vision, and so on may reliably identify object features from color intensities. For example, driving the vehicle 100 during daytime or using the prediction system 170 in the daylight, outdoors, in the morning, and so on may be environments having increased-light. Of course, reference to daytime versus nighttime to define lighting levels can generally be subjective due to variations in weather and other factors influencing lighting. Lux (lx) may represent lighting levels as a unit of luminance per square meter. Accordingly, daytime, increased-light, brighter lighting, and so on generally refer to conditions in which the ambient light may have sufficient lumens (e.g. 30k lx to 100k lx) for identifying object features related to depth processing. On the contrary, nighttime, low-light, indoors, and so on generally refer to conditions in which the ambient light may have insufficient lumens (e.g. 1 lx to 60 Lx) for identifying object features.

Figure 3A:
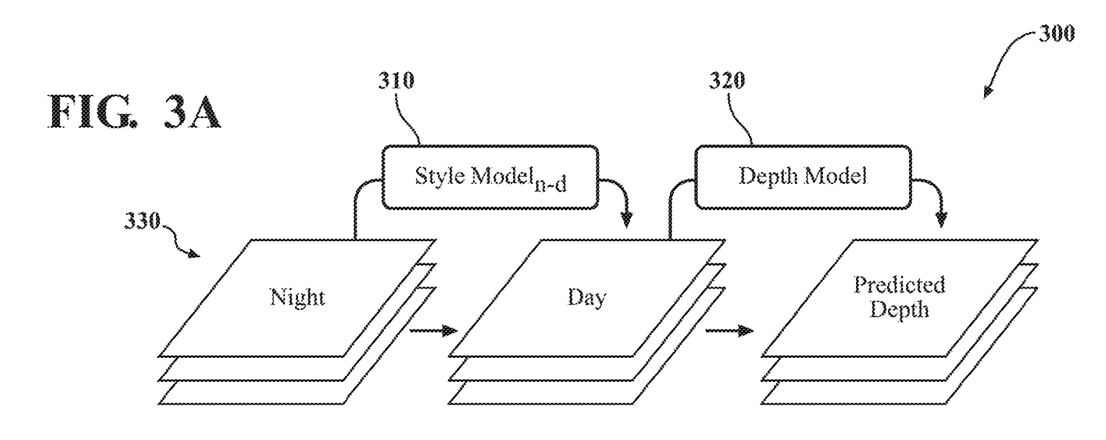
FIG. 3A illustrates one embodiment of the prediction system of FIG. 2 to predict the depth of objects within an image taken in low-light.

Further discussing prediction, FIG. 3A illustrates one embodiment of the prediction system 170 of FIG. 2 that predicts the depth of objects within an image taken at nighttime 300. The prediction module 220 and/or prediction system 170 may generate a depth map using the prediction system 170 as follows. The pipeline 330 may utilize the Style Model$_{n-d}$ 310 to convert a sequence of real images to a sequence of synthetic images. In one approach, the real images may be taken in low-light conditions or at nighttime by a monocular camera and the synthetic images may be increased-light or daytime representations. Here, the Style Modeled 310 may operate by predicting the way objects appear in the real images such as by colors, shadows, shading, lighting conditions, and so on. For example, the daytime representation may have the same content as the real image with increased richness and features to improve depth estimation.

Figure 3B:
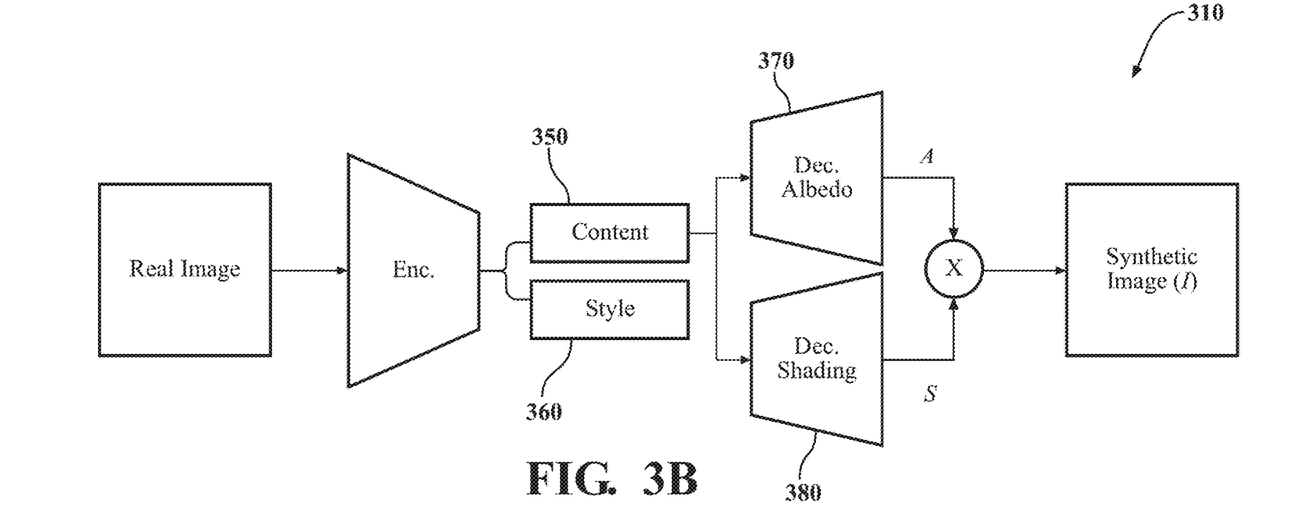
FIG. 3B illustrates one embodiment of a style model that converts a real image(s) to a synthetic image(s).

Regarding particular network architecture, FIG. 3B illustrates one embodiment of a style model that converts or transfers a real image(s) to a synthetic image(s). From an abstraction level, the Style Model$_{n-d}$ 310 may represent a GAN or neural network that predicts color intensities to identify object features within a low-light image. For instance, a GAN may include a pair of neural networks that compete in a zero-sum game for learning. The GAN output may be new data with similar statistics as training data. Here, a GAN may generate a synthetic image(s) by predicting and optimizing the way object features appear such as by colors, shadows, shading, lighting conditions, and so on in daytime from a nighttime image for predicting depth. As such, the Style Model$_{n-d}$ 310 may perform style or domain transfer by converting a real nighttime image(s) to a synthetic daytime image(s). The daytime representation may have the same content as the real image(s) while changing lighting or styles to increase richness. In one approach, the Style Model$_{n-d}$ 310 may be a cyclic GAN (cGAN) that performs predictions according to the real image input being the condition. In this way, the cGAN may regulate noise while generating synthetic representations substantially similar in content to real image inputs.

In various implementations, the Style Model$_{n-d}$ 310 may separate a real image into content information 350 and style information 360 through encoding. Content may identify objects in the real image such as vehicles, pedestrians, buildings, and so on. Whilst, style may identify object features, such as colors, shadows, lighting conditions, and so on. In this way, the pipeline 330 may reduce complexity and improve depth estimation by removing style variances from the real images. Furthermore, removing certain color, shadows, and lighting conditions may also reduce noise for processing the real images in low-light environments.

After encoding, the content information 350 may be decoded separately by the albedo decoder 370 and the shading decoder 380 to generate the synthetic image I as I=A·S. The albedo decoder 370 may identify intrinsic colors of objects without information regarding light projection about the content information 350. On the other hand, the shading decoder 380 may involve identifying shadows, reflections, and lighting conditions about the content information 350. As such, the albedo component A may be a matrix with magnitudes for colors in the real image without information regarding light projection about the content information 350. Whilst, the shading component S may be a matrix with magnitudes representing shadows, reflections, and lighting conditions about the content information 350. In other words, the albedo component may represent an intrinsic color layer that the prediction system 170 derives whereas the shading component is a processed representation of the image highlighting certain features.

Moreover, multiplying A S may produce a synthetic image I in the form of a matrix representing information about the content information 350. The synthetic image I may have rich color information accounting for shadows or reflections with improved scene radiance, particularly for low-light conditions. In this way, the prediction system 170 may optimize a low-light image for depth processing by distinguishing object features in a more radiant (e.g. daytime) representation using an albedo decoder decoupled from shading to highlight intrinsic colors. Thus, the pipeline 330 may predict depth more efficiently and improve subsequent object detection by relying on the albedo information and the radiance about the content information 350 from decoupling albedo and shading decoding.

Figure 4:
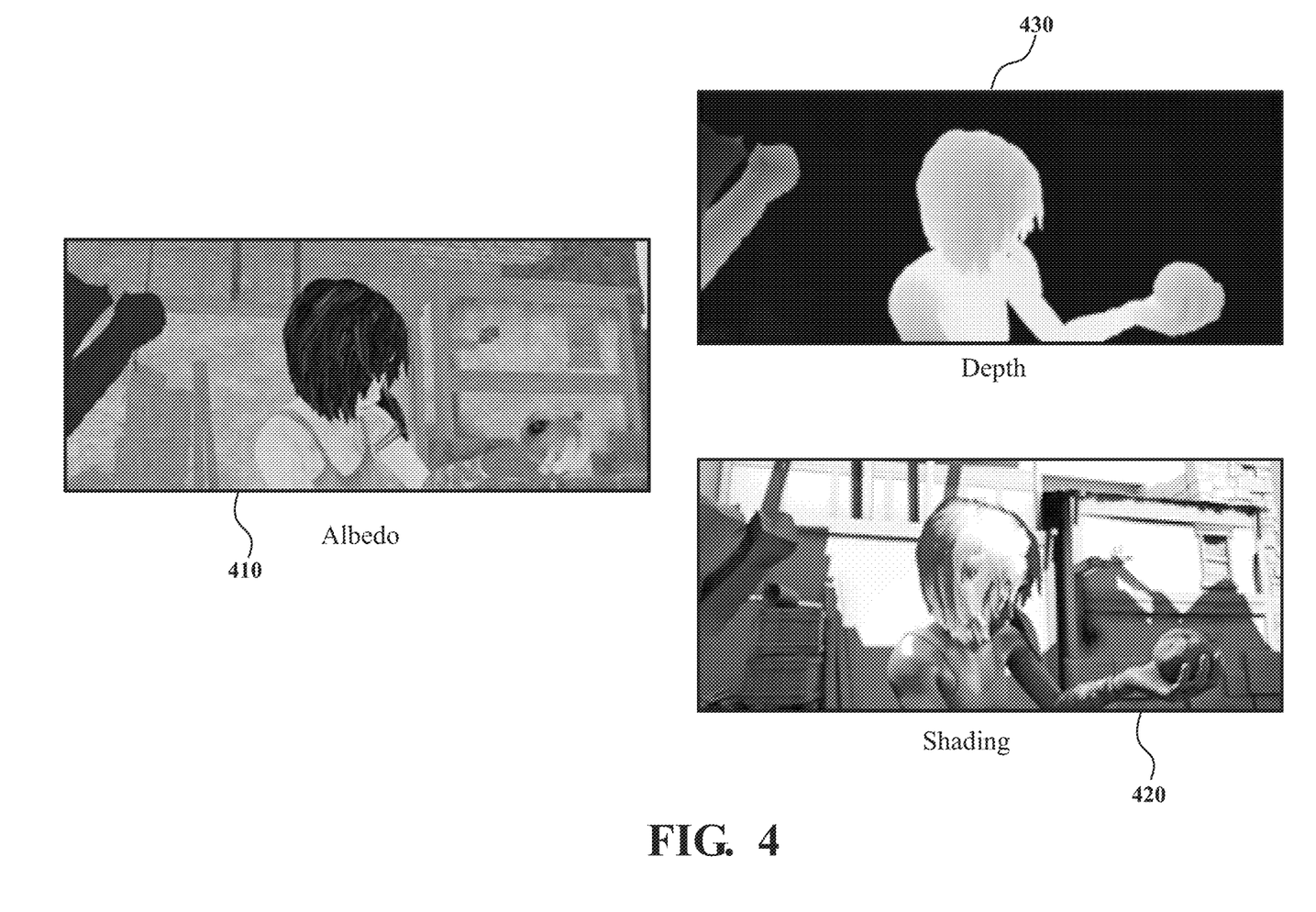
FIG. 4 illustrates an example of different information components and a depth map associated with an image.

FIG. 4 illustrates an example of different image components and a depth map associated with an image. The albedo component 410 and shading component 420 may indicate different features of an image used to improve the resolution and accuracy of the depth map 430. For example, the albedo component 410 may highlight intrinsic colors of a low-light image. Furthermore, in various implementations, the Style Model$_{n\text{-}d}$ 310 may perform albedo decoding followed by shading decoding according to lighting conditions and reflection parameters. In this way, the Style Model$_{n\text{-}d}$ 310 may obtain improved shading information regarding the intrinsic colors about the content information 350 by first identifying the intrinsic colors.

Returning to the processing in FIG. 3A, once the prediction system 170 computes a sequence of synthetic representations, the depth model 320 may predict depth maps from the sequence. The synthetic representations may be daytime or increased-light representations of real images taken in low-light (e.g. nighttime). In one approach, the depth model 320 may be a cGAN that predicts depth according to the input image being the condition. In this way, the cGAN may regulate noise while generating images for a depth map substantially similar in content to the synthetic representations used as inputs. In one approach, the output of the cGAN may be a depth map in grayscale where an intensity of each pixel represents the distance between an object and an image sensor or camera.

Regarding training of the pipeline 330, the depth model 320 may be trained in the synthetic domain using light-low conditions. In one approach, the training may involve two training stages where the first training stage computes a pose loss, a flow loss, and a supervised loss in the synthetic domain. The pose loss may adjust the prediction system 170 for movement by a sensor or camera capturing an image during a style conversion or transfer. The flow loss may adjust for the movement of objects within a low-light image between frames during depth map generation. Regarding the second training stage, the training of the depth model may involve using a synthetic representation of a real image taken in low-light to further optimize the pipeline 330 for inferences. In this way, the second training stage may utilize and refine the parameters from the first training stage.

Figure 5:
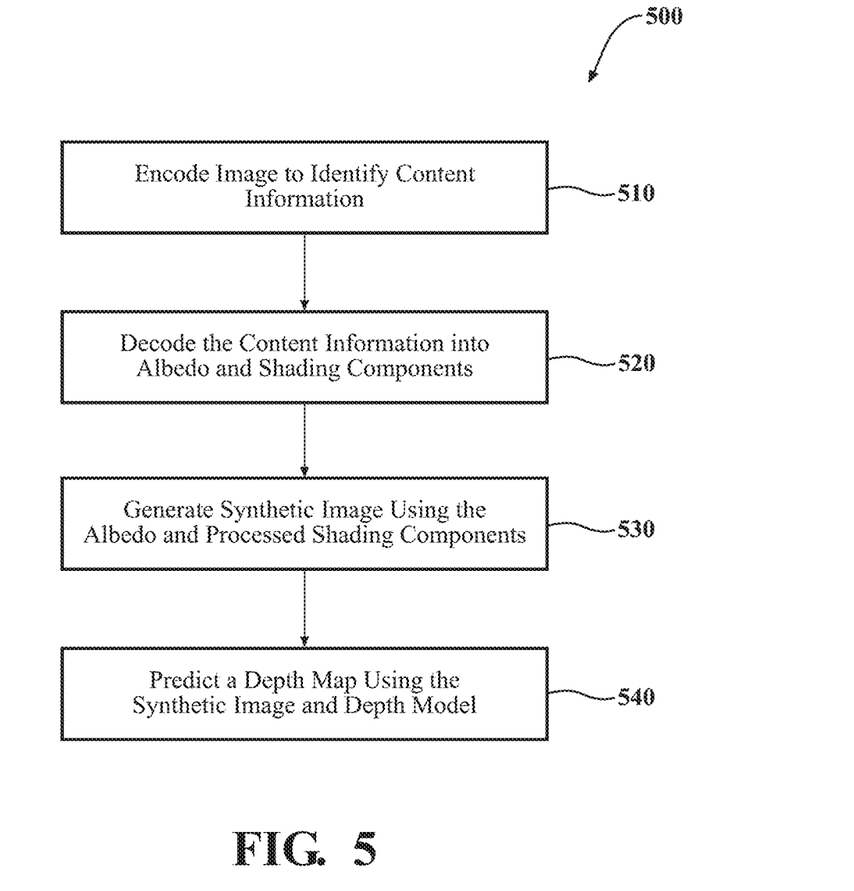
FIG. 5 illustrates one embodiment of a method that is associated with improving depth prediction for objects within a low-light image using a style model.

Turning now to FIG. 5, a flowchart of a method 500 that is associated with improving depth prediction for objects within a low-light image using a style model is illustrated. Method 500 will be discussed from the perspective of the prediction system 170 of FIGS. 1, and 2. While method 500 is discussed in combination with the prediction system 170, it should be appreciated that the method 500 is not limited to being implemented within the prediction system 170 but is instead one example of a system that may implement the method 500.

At 510, the prediction system 170 encodes an image to identify content information. For example, a style model may separate a real image into content and style information by encoding in a GAN network. Content information may identify objects in the real image such as vehicles, pedestrians, buildings, and so on. On the contrary, style information may identify object features, such as colors, shadows, lighting conditions, and so on. As described above, in this way the prediction system 170 may reduce complexity and improve depth estimation by removing style variances from the real images. For low-light images, removing certain color, shadows, and lighting conditions may also reduce noise for processing the real images.

At 520, the prediction system 170 decodes the content information into albedo and shading components. The content information may be decoded separately by an albedo decoder and a shading decoder. As explained above, albedo decoding may identify intrinsic colors of objects without information regarding light projection about the content information. Shading decoding may involve identifying shadows, reflections, and lighting conditions related to the content information. By decoupling albedo and shading decoding, the prediction system 170 may predict depth more efficiently and improve object identification by relying more on the albedo information and radiance.

Following encoding and decoding, at 530 the prediction system 170 generates a synthetic image using the albedo and processed shading components. The prediction system 170 may use the outputs of the albedo decoder and the shading decoder to generate the synthetic image I as I=A·S. As explained above, the albedo component A may be a matrix with magnitudes for colors in the real image without information regarding light projection about the content information. The shading component S may be a matrix with magnitudes of shadows, reflections, and lighting conditions about the content information. In this regard, the albedo component may represent an intrinsic color layer that the prediction system 170 derives from an image whereas the shading component is a processed representation of the image. Next, the prediction system 170 may produce a synthetic image I in the form of a matrix representing the content information by multiplying A·S. In particular, the synthetic image I may have color information accounting for shadows or reflections with improved scene radiance, particularly for low-light conditions, that improves depth processing.

Once the prediction system 170 generates the synthetic image I, at 540 the prediction system 170 predicts a depth map using the synthetic image I and a depth model. In one approach, the depth model may be a cGAN that predicts depth according to the input image being the condition. The output of the GAN may be a depth map in grayscale where an intensity of each pixel represents the distance between an object and an image sensor or camera. Accordingly, the method 500 may generate a depth map having improved accuracy for low-light conditions from decoupling the albedo and shading processing and using image content with style information removed.

FIG. 1 will now be discussed in full detail as an example environment within which the system and methods disclosed herein may operate. However, in various implementations, the system and methods may operate as given above in any device such as a CE device, a mobile device, a robot, a drone, a vehicle, a cloud-based service, and so on. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in a subset of possible modes.

In one or more embodiments, the vehicle 100 is an automated or autonomous vehicle. As used herein, "autonomous vehicle" refers to a vehicle that is capable of operating in an autonomous mode (e.g., category 5, full automation). "Automated mode" or "autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), an application-specific integrated circuit (ASIC), a microprocessor, etc. The vehicle 100 can include one or more data stores 115 for storing one or more types of data. The data store(s) 115 can include volatile and/or non-volatile memory. Examples of suitable data stores 115 include RAM, flash memory, ROM, Programmable Read-Only Memory (PROM), Erasable Programmable Read-Only Memory (EPROM), Electrically Erasable Programmable Read-Only Memory (EEPROM), registers, magnetic disks, optical disks, and hard drives. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, or hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

One or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo, or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, any of the systems or portions thereof may be otherwise combined or segregated via hardware and/or software within the vehicle 100. The vehicle 100 can include a propulsion system 141, a braking system 142, a steering system 143, a throttle system 144, a transmission system 145, a signaling system 146, and/or a navigation system 147. Any of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the prediction system 170, and/or the automated or autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the prediction system 170, and/or the autonomous driving module(s) 160 may control some or all of the vehicle systems 140 and, thus, may be partially or fully autonomous as defined by the society of automotive engineers (SAE) levels 0 to 5.

The processor(s) 110, the prediction system 170, and/or the autonomous driving module(s) 160 can be operatively connected to communicate with the various vehicle systems 140 and/or individual components thereof. For example, returning to FIG. 1, the processor(s) 110, the prediction system 170, and/or the autonomous driving module(s) 160 can be in communication to send and/or receive information from the various vehicle systems 140 to control the movement of the vehicle 100. The processor(s) 110, the prediction system 170, and/or the autonomous driving module(s) 160 may control some or all of the vehicle systems 140.

The processor(s) 110, the prediction system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the prediction system 170, and/or the autonomous driving module(s) 160 can control the direction and/or speed of the vehicle 100. The processor(s) 110, the prediction system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuator(s) 150 can be an element or a combination of elements operable to alter one or more of the vehicle systems 140 or components thereof responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processors 110. Alternatively, or in addition, one or more data stores 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the prediction system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the figures illustrate the architecture, functionality, and operation of possible implementations of systems, methods, and computer program products according to various embodiments. In this regard, a block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a ROM, an EPROM or Flash memory, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an ASIC, a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . ." as used herein refers to and encompasses any and all combinations of one or more of the associated listed items. As an example, the phrase "at least one of A, B, and C" includes A, B, C, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A prediction system for depth prediction comprising:
a processor;
a memory storing instructions that, when executed by the processor, cause the processor to:
encode, by a style model, an input image to identify content information and identify style information, wherein the content information identifies type features about objects within the input image and the content information is separated from the style information that identifies style features about the objects;
decode, by the style model separate from the style features, the content information into an albedo component and a shading component that generates a lighter representation of the input image;
generate, by the style model, a synthetic image using the albedo component and the shading component; and
provide the synthetic image to a depth model.

2. The prediction system of claim 1, further including instructions to decode the content information into the albedo component by a first decoder and decode the content information into the shading component by a second decoder that excludes factoring the style features, wherein the style features are one of color and lighting conditions.

3. The prediction system of claim 1, wherein the instructions to decode the content information further include instructions to generate the albedo component separately prior to the shading component, wherein the albedo component is independent of light projections represented by the content information.

4. The prediction system of claim 1, wherein the instructions to generate the synthetic image further include instructions to multiply values of the albedo component and the shading component.

5. The prediction system of claim 1, further including instructions to predict, by the depth model, a depth map using the synthetic image and communicate the depth map to a controller.

6. The prediction system of claim 1, wherein the input image is a nighttime image and the synthetic image is a daytime representation of the nighttime image.

7. The prediction system of claim 1, wherein the style model is a generative adversarial network (GAN).

8. The prediction system of claim 1, wherein the depth model is trained according to a first training stage that computes a pose loss for a style conversion and a flow loss for the depth model associated with predicting depths of low-light images in a synthetic domain.

9. The prediction system of claim 8, wherein the depth model is further trained by a second training stage that converts a nighttime image to a synthetic representation using an adversarial network.

10. A non-transitory computer-readable medium for predicting depth comprising:
instructions that when executed by a processor cause the processor to:
encode, by a style model, an input image to identify content information and identify style information, wherein the content information identifies type features about objects within the input image and the content information is separated from the style information that identifies style features about the objects;
decode, by the style model separate from the style features, the content information into an albedo component and a shading component that generates a lighter representation of the input image;
generate, by the style model, a synthetic image using the albedo component and the shading component; and
provide the synthetic image to a depth model.

11. The non-transitory computer-readable medium of claim 10, further including instructions to decode the content information into the albedo component by a first decoder and decode the content information into the shading component by a second decoder that excludes factoring the style features, wherein the style features are one of color and lighting conditions.

12. A method, comprising:
encoding, by a style model, an input image to identify content information and identify style information, wherein the content information identifies type features about objects within the input image and the content information is separated from the style information that identifies style features about the objects;
decoding, by the style model separate from the style features, the content information into an albedo component and a shading component that generates a lighter representation of the input image;
generating, by the style model, a synthetic image using the albedo component and the shading component; and
providing the synthetic image to a depth model.

13. The method of claim 12, further comprising:
decoding the content information into the albedo component by a first decoder; and
decoding the content information into the shading component by a second decoder that excludes factoring the style features, wherein the style features are one of color and lighting conditions.

14. The method of claim 12, wherein decoding the content information further includes generating the albedo component separately prior to the shading component wherein the albedo component is independent of light projections represented by the content information.

15. The method of claim 12, wherein generating the synthetic image further includes multiplying values of the albedo component and the shading component.

16. The method of claim 12, further comprising:
predicting, by the depth model, a depth map using the synthetic image; and
communicating the depth map to a controller.

17. The method of claim 12, wherein the input image is a nighttime image and the synthetic image is a daytime representation of the nighttime image.

18. The method of claim 12, wherein the style model is a generative adversarial network (GAN).

19. The method of claim 12, wherein the depth model is trained according to a first training stage that computes a pose loss for a style conversion and a flow loss for the depth model associated with predicting depths of low-light images in a synthetic domain.

20. The method of claim 19, wherein the depth model is further trained by a second training stage that converts a nighttime image to a synthetic representation using an adversarial network.

* * * * *

UNITED STATES PATENT AND TRADEMARK OFFICE
CERTIFICATE OF CORRECTION

PATENT NO. : 11,935,254 B2
APPLICATION NO. : 17/342853
DATED : March 19, 2024
INVENTOR(S) : Rui Guo et al.

It is certified that error appears in the above-identified patent and that said Letters Patent is hereby corrected as shown below:

In the Specification

Column 5, Lines 58 and 59: "Here, the Style Modeled 310" should be "Style Modeln-d 310"

Column 6, Line 50: "A S" should be "A · S"

Column 8, Line 11: "I as I=A S." should be "I as I = A · S."

In the Claims

Claim 14, Line 58: "component" should be "component,"

Signed and Sealed this
Sixteenth Day of April, 2024

Katherine Kelly Vidal
*Director of the United States Patent and Trademark Office*